United States Patent
Pascual Garcia et al.

(10) Patent No.: US 11,927,562 B2
(45) Date of Patent: Mar. 12, 2024

(54) HYDROGEN POTENTIAL SENSOR

(71) Applicant: LUXEMBOURG INSTITUTE OF SCIENCE AND TECHNOLOGY (LIST), Eschsur-Alzette (LU)

(72) Inventors: Cesar Pascual Garcia, Esch sur Alzette (LU); Damien Lenoble, Esch sur Alzette (LU)

(73) Assignee: LUXEMBOURG INSTITUTE OF SCIENCE AND TECHNOLOGY (LIST), Eschsur-Alzette (LU)

( * ) Notice: Subject to any disclaimer, the term of this patent is extended or adjusted under 35 U.S.C. 154(b) by 0 days.

(21) Appl. No.: 18/036,430

(22) PCT Filed: Nov. 10, 2021

(86) PCT No.: PCT/EP2021/081253
§ 371 (c)(1),
(2) Date: May 11, 2023

(87) PCT Pub. No.: WO2022/112005
PCT Pub. Date: Jun. 2, 2022

(65) Prior Publication Data
US 2023/0324330 A1    Oct. 12, 2023

(30) Foreign Application Priority Data

Nov. 25, 2020 (LU) .......................... 102240
Dec. 1, 2020 (LU) .......................... 102245

(51) Int. Cl.
*G01N 27/414* (2006.01)
(52) U.S. Cl.
CPC .................... *G01N 27/414* (2013.01)
(58) Field of Classification Search
CPC .................................................. G01N 27/414
See application file for complete search history.

(56) References Cited

U.S. PATENT DOCUMENTS

2019/0262827 A1* 8/2019 Lalonde ................. G01N 21/63
2020/0088723 A1* 3/2020 Mohanty ............... G01N 27/227
(Continued)

FOREIGN PATENT DOCUMENTS

WO    2016037663 A1    3/2016

OTHER PUBLICATIONS

U.S. Appl. No. 14/510,178 (Year: 2020).*
(Continued)

*Primary Examiner* — Erik Kielin
(74) *Attorney, Agent, or Firm* — CANTOR COLBURN LLP (57) ABSTRACT

A pH sensor comprises: a chamber for receiving an electrolyte solution; a first and a second ion-sensitive field effect transistor (ISFETs), each of the first and second ISFETs having a source terminal, a drain terminal and a transistor channel extending between the source terminal and the drain terminal, a dielectric layer with a sensing surface arranged in the chamber so as to be contactable by the electrolyte solution, the dielectric layer separating the sensing surface from the transistor channel; a first measurement circuit configured to measure a first source-drain resistance across the transistor channel of the first ISFET; and a second measurement circuit configured to measure a second source-drain resistance across the transistor channel of the second ISFET. The first and second measurement circuits include a common reference electrode, the reference electrode arranged contactable by the electrolyte solution in the chamber. The dielectric layer of first ISFET has a first thickness and the dielectric layer of the second ISFET has a second thickness different from the first thickness.

18 Claims, 7 Drawing Sheets

(56) References Cited

U.S. PATENT DOCUMENTS

2020/0173958 A1 6/2020 Chiang
2021/0159321 A1* 5/2021 Martens ............. G01N 27/4145

OTHER PUBLICATIONS

International Search Report for corresponding application PCT/EP2021/081253 filed Nov. 10, 2021; dated Feb. 9, 2022.
Written Opinion for corresponding application PCT/EP2021/081253 filed Nov. 10, 2021; dated Feb. 9, 2022.
Melpomeni Kalofonou, "A Low Power Sub-u W Chemical Gilbert Cell for ISFET Differential Reaction Monitoring" IEEE Transactions on Biomedical Circuits and Systems, vol. 8, No. 4, Aug. 2014.
International Preliminary Report on Patentability for corresponding application PCT/EP2021/081253; Report dated May 30, 2023.

\* cited by examiner

Fig. 1 (Technical background)

Fig. 2 (Technical background)

Fig. 3 (Technical background)

Fig. 4 (Technical background)

HYDROGEN POTENTIAL SENSOR

FIELD OF THE INVENTION

The invention generally relates to a pH sensor, in particular, to a pH sensor comprising ion-sensitive field-effect transistors (ISFETs).

BACKGROUND OF THE INVENTION

Ion Sensitive Field Effect Transistors (ISFETs)[1] are commonly used sensors to measure the proton concentration (potential of hydrogen or pH) in aqueous solutions accurately. ISFETs may be produced using fabrication methods of the semiconductor industry and, due to their low footprint, operation current and voltages, they are compatible with complementary metal oxide semiconductor (CMOS) circuits. This makes them suitable for applications that require massive multiplexing and high degree of integration, such as, e.g. personalized precision medicine, in-vivo physiological measurements and wearables.

ISFETs were first developed in the 1970s, as an alternative to the glass electrodes for pH and ion measurements. The structure of an ISFET is comparable to that of a MOSFET (metal-oxide-semiconductor field-effect transistor) except that the gate dielectric is exposed to the analyte solution (electrolyte solution), so that ions in the solution influence the gate potential and exert electrostatic control on the source-drain current. A reference electrode in contact with the analyte solution is used to determine the potential of the analyte solution. For a fixed potential at the reference electrode (reference potential), only the surface potential at the gate dielectric changes with the pH and so does the source-drain current.

ISFETs transduce the acidity by the capacitance effect measuring hydrogen ions adsorbed on a sensitive dielectric layer able to trap the protons from the electrolyte solution depending on its bulk concentration. (Cf.[2], describing a general model for the electrostatic potential at electrolyte solution oxide interfaces.) The changes at the surface are transduced by the modulation of the conductivity of an underlying semiconductor channel (transistor channel). The conductivity changes as the potential from the adsorbed ions depletes regions populated by charge carriers, creating a depletion width ($W_D$) that decreases the effective conductive cross-section of the transistor channel. The main difference of ISFETs with respect to MOSFETs is the complexity of the potential built at the liquid gate interface. In MOSFETs, the potential at the interface of the dielectric oxide (and thus in the transistor channel) is directly determined by the potential induced in the metal of the gate electrode, controlled by an external bias. With ISFETs, the effect of charged analyte moieties adsorbed on the dielectric interface is shared to balance both ions in the electrolyte solution and, to a lesser extent, the free mobility carriers in the semiconductor channel. Therefore, the potential on the surface of the sensor is attenuated by ions in solution. Nevertheless, the possibility to tune the amount of charge in semiconductors by controlling the doping ($N_A$) or with a backgate, down to a minimum amount of charge comparable to that proportion of analyte charges that, at equilibrium, tune the semiconductor potential, provides ISFETs a very high pH sensitivity.

One of the main obstacles for a more widespread application of ISFETS is that the sensing interface deteriorates irreversibly by the chemical effect of the adsorption of ions by the dielectric component of the capacitance element of the ISFETs [3]. The result of this deterioration is a monotonous change in the capacitance of the sensor, which, for a given pH and for fixed source-drain and reference voltages, translates into a drift one can observe in the source-drain current.

The deterioration of the dielectric is detrimental to the accuracy of the sensor. Furthermore, due to the drift, ISFETs require multiple re-calibrations for absolute pH measurement. Re-calibrations may be done using reference buffers with known acidity, or by titration with acid.

The scientific literature proposes different explanations for the observed drift, including the injection of charges (electrons and ions) from the electrolyte solution and slow surface effects, but the main effect is a change in the effective capacitance [4].

SUMMARY OF THE INVENTION

The invention improves the measurement of pH with Ion Sensitive Field Effect Transistors (ISFETs), reducing the need of repetitive and/or continuous calibrations and mitigating the problem of drifts.

According to an aspect of the invention, a pH sensor comprises:
- a chamber for receiving an electrolyte solution;
- a first and a second ion-sensitive field effect transistor (ISFETs), each of the first and second ISFETs having
  - a source terminal, a drain terminal and a transistor channel extending between the source terminal and the drain terminal;
- a dielectric layer with a sensing surface arranged in the chamber so as to be contactable by the electrolyte solution, the dielectric layer separating the sensing surface from the transistor channel;
- a first measurement circuit configured to measure a first source-drain resistance across the transistor channel of the first ISFET; and
- a second measurement circuit configured to measure a second source-drain resistance across the transistor channel of the second ISFET.

The first and second measurement circuits include a common reference electrode, the reference electrode arranged contactable by the electrolyte solution in the chamber. The dielectric layer of first ISFET has a first thickness and the dielectric layer of the second ISFET has a second thickness different from the first thickness. Preferably the thickness of the dielectric layer of one of the first and second ISFETs amounts to at least 1.05 times (more preferably at least 1.1 times, still more preferably at least 1.2 times and even more preferably at least 1.5 or 2 times) the thickness of the other one of the first and second ISFETs.

As used herein, the term "chamber" designates a delimited volume wherein the pH of the electrolyte solution is measured. The sensing surfaces of the first and the second ISFETs are arranged in the (same) chamber. There are no particular constraints on the shape of the chamber. Preferably, however, the chamber is designed without a constriction between the sensing surfaces of the first and the second ISFETs, such that it can be assumed that the electrolyte solution has the same composition and thus the same pH for both measurements. However, the presence of a constriction or other obstacle to fluidic exchanges between the sensing surfaces of the first and the second ISFETs need not be excluded if the effect on the measurements is known and can thus be taken into account or compensated. For instance, when the electrolyte solution flows from the first sensing surface to the second sensing surface the measurements made with the second ISFET will be delayed with respect to those of the first ISFET by the time it takes for the electrolyte solution to cover the distance between the first and second sensing surfaces.

The arrangement of the first and second sensing surfaces within the same chamber ascertains that during the lifetime of the pH sensor, each sensing surface has essentially the same history in terms of exposure to electrolyte solution(s).

The first and second measurement circuits may comprise a voltage source and a current sensor, a current source and a voltmeter, an ohmmeter and/or various other transducers capable of measuring resistance directly or indirectly. In the present context, a measure of the source drain current at a known (or measured) source-drain voltage is considered to be a measure of the source-drain resistance. Likewise, a measure of the source drain voltage at a known (or measured) source-drain current is also considered to be a measure of the source-drain resistance. This is because, for the purpose of the invention, source-drain resistance need not be expressed in units of $\Omega$ but any units or measures could be used, especially if this use is only internal to the pH sensor.

The expression "common reference electrode" is intended to encompass the case where the electrolyte solution is contacted with plural reference electrodes that are kept at the same electric potential.

As those skilled in the art will know, the pH of the electrolyte solution may be derived from the measured source-drain resistance since for every ISFET there is a device-specific relationship between source-drain resistance and pH that depends on certain material and geometric parameters of the ISFET. For a given ideal ISFET, the specific relationship (transfer function) can be assumed to be known but for a real ISFET, the specific relationship may change over time, e.g. because of the above-mentioned deterioration of the dielectric layer. Usually, one would calibrate the ISFET before measuring the unknown pH of an electrolyte solution in order to determine as precisely as necessary how measured resistance maps to pH. The calibration step corresponds to determining the special relationship (transfer function) for a given ISFET at a given time.

For both the first and the second source-drain resistances, there is a specific first and second relationship, respectively, with pH. Thanks to the fact that dielectric layer thickness of the first and second ISFETs are different, the specific relationship that ties the pH to the first source-drain resistance (transfer function of the first ISFET) is different from the specific relationship that ties the pH to the second source-drain resistance (transfer function of the second ISFET). Therefore, when measuring the first and second source-drain resistances at the same time ("at the same time" meaning simultaneously or one so closely after the other that it can be assumed that pH did not vary significantly between the measurements) one obtains a system of equations, which allows, further to deriving the pH, eliminating one unknown parameter that appears in both relationships (transfer functions). Preferably, the unknown parameter would correspond to deterioration of the dielectric layer due to exposure to electrolyte solution(s). In this context, it is worthwhile noting that because the sensing surfaces are located in the same chamber, over the lifetime of the pH sensor, they will be exposed to the same environmental conditions and therefore integrate the same degradations over time. Therefore, assuming that there is a common deterioration parameter (yet of an a priori unknown value) is justified.

Furthermore, the difference in the thicknesses of the dielectric layers of the first and second ISFETs preferably causes dielectric layer degradation (chemical modification into the depth of the dielectric layer, caused by exposure to electrolyte solution(s)) to affect a relationship between the first source-drain resistance and pH (transfer function of the first ISFET) differently than a relationship between the second source-drain resistance and pH (transfer function of the second ISFET). If one expresses pH as a function, f, of source-drain resistance r and different parameters (depending on ISFET geometry and materials), $p_1, p_2, \ldots, p_n$, one may write: $pH=f(r, p_1, p_2, \ldots, p_n)$. Assuming that:
among those parameters $p_1$ represents dielectric layer degradation (which is equal for both ISFETs),
$pH=f(r_{first}, p_1, p_{2,first}, \ldots, p_{n,first})=: f_{first}(r_{first}, p_1)$ represents the relationship between the first source-drain resistance $r_{first}$ and pH (transfer function of the first ISFET),
and $pH=f(r_{second}, p_1, p_{2,second}, \ldots, p_{n,second})=: f_{second}(r_{second}, p_1)$ represents the relationship between the second source-drain resistance $r_{second}$ and pH (transfer function of the second ISFET), the fact that the relationships (transfer functions) are differently affected means that for any given pH, the derivative of first with respect to $p_1$ differs from the derivative of f second with respect to $p_1$:

$$\frac{df_{first}}{dp_1}(r_{first}, p_1) \neq \frac{df_{second}}{dp_1}(r_{second}, p_1). \qquad \text{(Equation 1)}$$

Otherwise stated, the difference in the thicknesses of the dielectric layers of the first and second ISFETs preferably causes dielectric layer degradation to affect, at a given time, a different proportion of the dielectric layer of the first ISFET than of the dielectric layer of the second ISFET.

The dielectric layer of each ISFET, which serves as an insulating barrier, preferably comprises or consists of an oxide layer. The oxide layer preferably has a thickness of 30 nm or less, e.g. 25 nm or less, 20 nm or less, 15 nm or less, or 10 nm or less. The oxide layer could comprise or consist of binary or ternary oxide(s), e.g., $SiO_2$, $Al_2O_3$, $Ta_2O_5$, $ZrO_2$, $CeO_2$, $DyScO_3$, $LaAlO_3$, $GdScO_3$, $LaScO_3$ $HfO_2$, $La_2O_3$, $TiO_2$, YSZ (yttria-stabilized zirconia) and combinations of these. Among the binary oxides, $SiO_2$, $Al_2O_3$ and $HfO_2$ are preferred, $SiO_2$ because of its excellent interface with Si, $Al_2O_3$, because is one of the oxides most commonly implemented in atomic layer deposition (ALD) processes and $HfO_2$ because of its high dielectric constant, its large band offset with Si, its thermodynamic and kinetic stability and its good interface with Si. Additionally or alternatively, the dielectric layer of each ISFET could comprise or consist of a dielectric that is not an oxide, e.g., $Si_3N_4$ or a dielectric organic composite.

According to an aspect, the pH sensor may comprise a controller operatively connected to the first and second measurement circuits and configured to determine pH of the electrolyte solution based on the first source-drain resistance and the second source-drain resistance. The controller could comprise a microcontroller, an application-specific integrated circuit (ASIC), a system on a chip (SoC), a programmable logic device (PLD), an erasable programmable logic device (EPLD), a programmable logic array (PLA), a field-programmable gate array (FPGA), a generic microprocessor and/or other hardware adequately programmed for the task, or the like.

The controller preferably has electronic access to a map that maps pairs of first and second source-drain resistances (or tuples of source-drain resistances including the first and second source-drain resistances) to pH and the controller is preferably configured to determine pH by using the map. As will be appreciated, the map corresponds to the response function of the pH sensor, taking as inputs the available measurements (of the first and second and any optional further ISFETs) and mapping those inputs onto a pH value. The map may be stored in any suitable electronic form, e.g. as a function with (or without) adjustable parameters (which may be adjusted by optimizing an objective function, e.g. by minimizing a cost or loss function or maximizing a reward or profit function), as one or more lookup tables, etc. in a local memory of the controller or in a storage place that the controller is connected to by a data connection. Lookup tables may be generated in a pre-characterization stage for each type of ISFET: pH and dielectric layer degradation are varied in respective ranges and the response of the ISFET in terms of current or resistance is recorded. When the pH sensor is in use, for each pair of first and second source-drain resistances, there is one matching combination of pH and dielectric layer degradation. To find the matching combination, The controller may use a lookup strategy and interpolation.

Additionally or alternatively, the controller may be configured to use a model-based filter, e.g. a Kalman filter, an extended Kalman filter, an unscented Kalman filter, a hybrid Kalman filter, a dynamic data reconciliation filter to determine pH.

According to a preferred aspect, at least one of the first and second ISFETs is a FinFET, more preferably a FinFET, wherein the transistor channel cross section has an aspect ratio (height/width) of at least 4, preferably more. The transistor channel could have a height-to-width ratio of at least 10, 15, 20, 25, 30 or even more. Preferably, the fin has a width in the range from 10 nm to 300 nm. Preferably, the fin has a height in the range from 0.5 µm to 100 µm. Preferably, the height of the fin lies in the range from 0.5 µm to 10 µm. As used herein, the expression "height" refers to the direction perpendicular to the substrate.

Alternatively, the first and second ISFETs could include a planar ISFET (also: ribbon-type ISFET) and/or a nanowire ISFET, e.g. a silicon nanowire (SiNW) ISFET. Junction-less wire or nanoribbon ISFETs preferably have height from 50 nm to 300 nm, a length from 0.5 µm to 200 µm and/or a width from 10 nm to 300 nm. Nanowire ISFETs preferably have a width and a height in the range from 50 nm to 300 nm and/or la length from 1 µm to 100 µm.

Preferably, the transistor channels of the first and second ISFETs are made of the same semiconductor material, have the same doping (in terms of dopant and dopant concentration) and have the same dimensions. Preferred doping values would be from $10^{14}$ to $10^{19}$ cm$^{-3}$. The transistor channel could be formed of n-doped silicon. Alternatively, it could be formed of p-doped silicon. The transistor channel could further work in accumulation-mode or depletion-mode.

The ISFETs are preferably implemented as junction-less field-effect transistors, i.e. with the same type (n or p) carrier doping between the transistor channel and the source and drain, respectively. Junction-less field-effect transistors can be implemented as Si nanowires, which are narrow enough to allow for full depletion of carriers when the transistor is turned off. A junction-less field-effect transistor could, however, also be implemented by a nano-fin.

Also preferably, the sensing surfaces of the of the first and second ISFETs have the same surface functionalisation. The expression "surface functionalisation" encompasses an additional surface functionalisation that modifies the surface of the dielectric layer totally or only in part.

The first and second ISFETs are preferably identical except for one system parameter, e.g. the thickness of the dielectric layer. Such an embodiment, wherein the first and second ISFETs differ only in one specific parameter, may be preferred when the relationships between the first source-drain resistance and pH and between the second source-drain resistance and pH are represented by the same analytically modelled transfer function, that transfer function describing the output of the respective ISFET as a parametric relationship between the state of the ISFET, the state of the ISFET being defined by the measured resistance (or current and voltage) and several system parameters (e.g. electric, material and geometric parameters), among which at least one differs between the first ISFET and the second ISFET, e.g. dielectric layer thickness. Indeed, in this case, for each joint ISFET measurement, one obtains a system of equations, which allows to derive the pH and to eliminate a parameter that includes the degradation of the dielectric layers (e.g. the capacitance of the dielectric layers).

According to a preferred aspect, the pH sensor comprises a third and a fourth ISFET, the third ISFET being identical to the first ISFET except that the sensing surface of the third ISFET has a different surface functionalisation and/or coverage than the first ISFET and the fourth ISFET being identical to the second ISFET except that the sensing surface of the fourth ISFET has a different surface functionalisation and/or coverage (proportion of the dielectric surface covered by a given surface functionalisation) than the second ISFET.

It will be appreciated that ISFETs that are identical except for surface functionalisation and/or coverage may help to detect and/or to mitigate another mechanism that may cause drift of the sensor output: surface contamination, i.e. the occupation of surface sites by chemical substances present in the electrolyte solution(s). In this context, a distinction is made between chemical modification of the dielectric layer caused by exposure to the electrolyte solution and surface contamination. Both phenomena may take place concurrently and both may have an impact on the measured current or resistance. By using different surface functionalization and/or coverage on otherwise identical sensors, a system of equations may be obtained, which can be solved for pH and surface contamination. Lookup tables may be generated in a pre-characterization stage for each type of ISFET: pH and surface contamination are varied in respective ranges and the response of the ISFET in terms of current or resistance is recorded. When the pH sensor is in use, for each pair of source-drain resistances, there is one matching combination of pH and surface contamination. To find the matching combination, the controller may use a lookup strategy and interpolation.

According to another aspect, the third ISFET is identical to the first ISFET except that the dielectric layer of the third ISFET comprises a different material than the first ISFET and the fourth ISFET is identical to the second ISFET except that the dielectric layer of the fourth ISFET comprises a different material than the second ISFET.

According to another aspect, the third ISFET is identical to the first ISFET except that the transistor channel of the third ISFET has a different cross-sectional area and/or a different length than the transistor channel of the first ISFET and the fourth ISFET is identical to the second ISFET except that the transistor channel of the fourth ISFET has a different cross-sectional area and/or a different length than the transistor channel of the first ISFET. ISFET combinations with different geometrical parameters may be used to eliminate (to solve for) the temperature parameter from the equations. Such a configuration may be of particular interest when otherwise a separate thermometer (e.g. a thermocouple) would be needed. When there is an external control of the temperature, the temperature may be assumed fixed so that there may be no need for a temperature measurement and the pH sensor could be optimized for the specified operating temperature.

According to a further preferred aspect, the pH sensor comprises a third, a fourth, a fifth and a sixth ISFET, the first, third and fifth ISFETs being pairwise identical except for a difference in one of:
sensing surface functionalisation and/or coverage, dielectric layer material, and
transistor channel cross-sectional area and/or length;
and the second, fourth and sixth ISFETs being pairwise identical except for a difference in one of:
sensing surface functionalisation and/or coverage, dielectric layer material, and
transistor channel cross-sectional area and/or length.

Preferably, the third and the fourth ISFETs are identical except for dielectric layer thickness and the fifth and the sixth ISFETs are also identical except for dielectric layer thickness.

In the present document, the verb "to comprise" and the expression "comprised of" are used as open transitional phrases meaning "consist at least of" or "include". Unless otherwise implied by context, the use of singular word form is intended to encompass the plural, except when the cardinal number "one" is used: "one" herein means "exactly one". However, when the plural form of a word is used, the intended meaning is that there are at least two instances of what the word designates. Ordinal numbers ("first", "second", etc.) are used herein to differentiate between different instances of a generic object; no particular order, importance or hierarchy is intended to be implied by the use of these expressions. Furthermore, when plural instances of an object are referred to by ordinal numbers, this does not necessarily mean that no other instances of that object are present (unless this follows clearly from context). For example, in relation with a pH sensor that is said to include a first and a second ISFET, the fact that the first and second ISFETs are explicitly mentioned does not exclude that there could be further ISFETs.

BRIEF DESCRIPTION OF THE DRAWINGS

The accompanying drawings illustrate several aspects of the present invention and, together with the detailed description, serve to explain the principles thereof. In the drawings.

DETAILED DESCRIPTION OF PREFERRED EMBODIMENTS

A preferred embodiment of the invention relies on an array of ISFETs, with a minimum number of two ISETs, wherein the transistor channel a well-defined geometrical cross-section with well-known dimensions perpendicular to the sensing surface of the dielectric layer.

ISFETs can be implemented, for example, as junction-less planar sensors[5], nanowires[6] (NWs), or FinFETs[7],[8] built with silicon-on-insulator (SOI) technology. In a planar junction-less FETs[5], the cross-section is defined by the height of the semiconductor device layer (hs) perpendicular to the dielectric sensing surface in the SOI channel. In a high-aspect ratio FinFET[9], the cross section can be changed by changing the width (WC) of the device without requiring the height of the channel to be changed. In the case of NWs or regular FinFETs, the control of the depletion width can be achieved in one or both dimensions perpendicular to the direction of the conduction current. Also, all these configurations can be adapted to an extended gate configuration instead of a direct gate[10].

Figure 1:
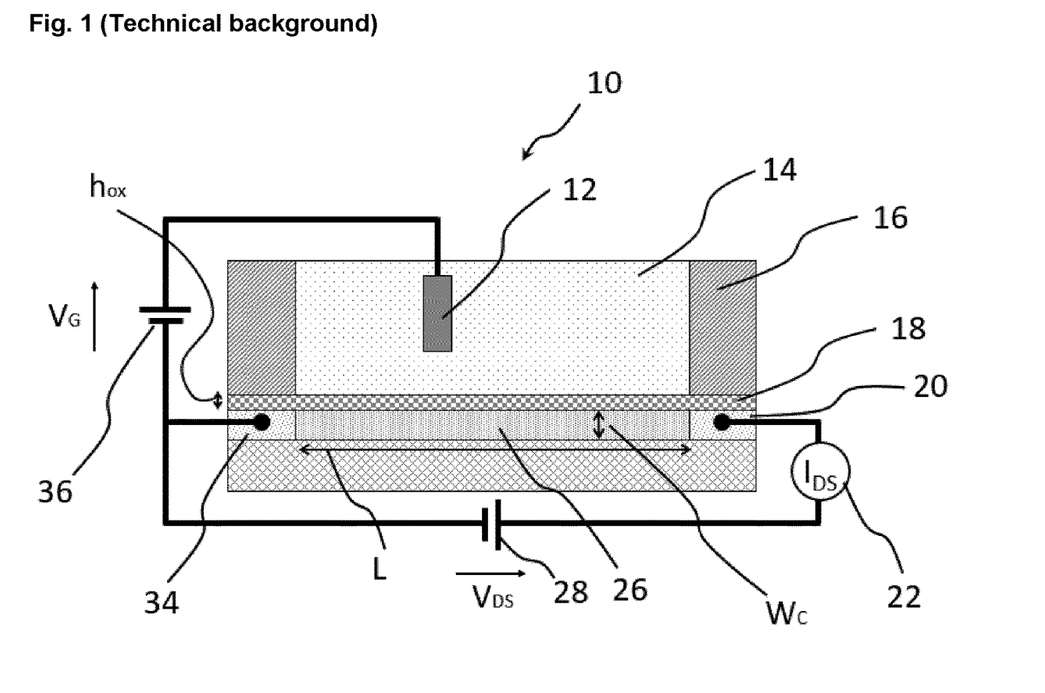
FIG. 1: is a illustration of a planar junction-less ISFET, helping to understand the principles of operation of an ISFET.

As can been seen in FIG. 1, showing the example of a planar junction-less ISFET, an ISFET 10 is operated with three electrical parameters that can be used as input or output parameters when pH is to be determined. These include the gate potential, $V_G$, the drain-source current, $I_{Ds}$, and the drain-source voltage, $V_{DS}$. The gate potential is applied by gate voltage source 36, between the source 34 or drain 20 (source being more typical) and the electrolyte solution 14, which is electrically connected by a reference electrode 12. The chamber containing the electrolyte solution 14 is laterally delimited by walls 16. The drain-source voltage is applied by drain-source voltage source 28 and the drain-source current Ias across the transistor channel 26 is measured with current sensor 22. Drain-source current $I_{DS}$ and voltage $V_{DS}$ determine the direct resistivity or conductance of the semiconductor channel (transistor channel) 26. Traditionally, ISFETs are measured at constant $V_{DS}$ modulating $V_G$ to maintain a constant $I_{Ds}$[23]. This configuration compensates the changes in the surface potential ($\psi_0$) caused by the adsorption of protons and has the advantage that the changes in $V_G$ reflect in ideal conditions the changes in (Po. These changes can be modelled from the number of sites ($N_s$) adsorbing protons on the sensing surface of the dielectric layer 18 and their chemical affinity ($pK_a$ and $pK_b$)[2]. While the modulation of the gate voltage has been the main configuration used with many FET geometries, it cannot discriminate the changes in surface potential due to pH or to the adsorbed ions irreversibly attached to the dielectric because it assumes that the dielectric layer 18 and the sensing surface do not change. The thickness of the dielectric layer will be denoted $h_{ox}$, the length of the transistor channel 26 will be denoted L and the width of the transistor channel perpendicular to the sensing surface will be denoted $W_C$. The width of the transistor channel parallel to the sensing surface will be denoted $W_T$. As used herein, $W_C$ is the width of the semiconductor material that forms the transistor channel and this parameter does not change with pH.

The other option to obtain the information on pH changes is not to modulate the gate potential but to measure the changes in the output characteristics, measuring $I_{DS}$, $V_{DS}$ or the resistance (or conductance) in the transistor channel 26 at constant $V_G$. This configuration has the advantage that is enables multiplexing by using a common reference gate for multiple ISFETs.

To account for drifts (e.g. caused by dielectric layer degradation and/or sensing surface contamination) without need for repetitive calibration, a pH sensor comprising array of ISFETs is proposed, the ISFETs of the array having different system parameters that are sensitive to the drift. The measurements of the ISFETs are then computationally combined, whereby the bulk pH may be derived.

The individual ISFETs of the pH sensor are configured to operate in the linear range in depletion mode (for the derivation of pH measures, it will be assumed that the transistor channel consists of a p-doped semiconductor for positive ions like protons but the adaptation to a transistor channel consisting of an n-doped semiconductor is straightforward).

An initial offset potential $V_{fb\text{-}pzc}$, to serve as a reference potential, can be defined as:

$$V_{fb-pzc} = V_{fb} - \left(2.3\frac{k_B T}{q}\right)\alpha \cdot (\text{pH} - \text{pH}_{pzc}) \quad \text{(Equation 2)}$$

where $V_{fb}$ is the flatband potential, $k_B$ is the Boltzman constant, T is the temperature of the sensor (in K), q is the elementary (carrier) charge, $\alpha$ is the (dimensionless) sensitivity parameter of the sensor (value of a is between 0 and 1 depending on the intrinsic buffer capacity and the differential capacitance, cf. [2]; $\alpha$ depends on the surface functionalization) and $\text{pH}-\text{pH}_{pzc}$ is the difference between the pH of the bulk of the electrolyte solution used for calibration minus the zero point charge pH ($\text{pH}_{pzc}$, the pH where no charges are adsorbed onto the surface, which is a property known and measurable in each material, e.g. for $SiO_2$, $\text{pH}_{pzc}$ is 2). $V_{fb\text{-}pzc}$ is a combination of $V_{fb}$ and the voltage at the point of zero charge, where the semiconductor channel is fully populated and the section of the actually conductive region correspond to the physical dimensions of the transistor channel, and which is taken as an offset.

Figure 2:
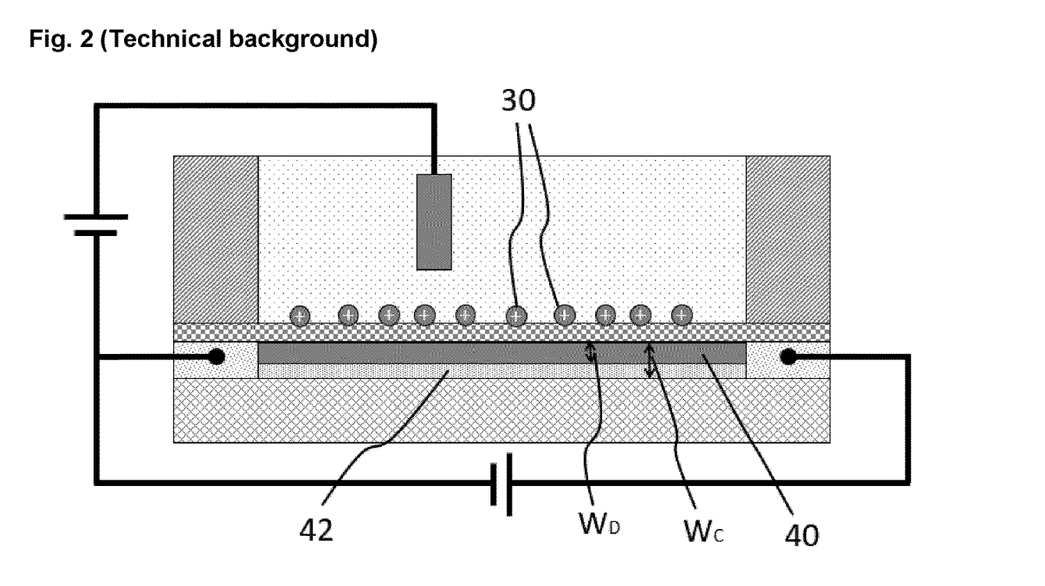
FIG. 2: is another illustration of the planar junction-less ISFET of FIG. 1, when protons are adsorbed on the ISFET's sensing surface.

During operation of the ISFETs, the offset voltage can be shifted by any bias as long the ISFETs continue to operate in the linear regime for the pH range of interest. All the considerations below can be shifted by that voltage. FIG. 2 schematically illustrates a situation of protons 30 adsorbed on the sensing surface generating a depleted region in the transistor channel, adjacent to the dielectric layer. In what follows, the width of that region (depletion width) will be denoted $W_D$. For simplicity, the depleted region 40 is shown with a hard boundary to the rest of the transistor channel 26. In the illustrated case of a junction-less ISFET, the effective width of the actually conducting region 42 of the transistor channel amounts to We-Wo. Considering for simplicity the situation at $V_{fb\text{-}pzc}$ (the band in the semiconductor is flat). In the linear range, the conductance ($\Sigma=I_{sd}/V_{sd}$, where $I_{sd}$ and $V_{sd}$ are the source-drain current and voltage respectively) of the device is:

$$\Sigma = \sigma\frac{A}{L} \quad \text{(Equation 3)}$$

where $\sigma$ is the doping- and temperature-dependent conductivity of the semiconductor material, L is the length of the transistor channel and A is the effective cross-sectional area of the conducting region 42 of the transistor channel. At $V_G=V_{fb\text{-}pzc}$, the area A coincides with the geometrical cross-sectional area $W_C \cdot W_T$ of the transistor channel. When as acidity increases, the transistor channel becomes more and more depleted where the gate is in contact with the electrolyte solution. The depletion width $W_D$ is connected to the experimental data by the (constant) cross-sectional area of the transistor channel and the actual resistance of the channel. For example, in the case of a planar junction-less ISFET, the depletion width is calculated from measured current considering the difference in the channel width $W_C$[2]:

$$W_D = W_C - \frac{L \cdot \Sigma}{\sigma W_T} = W_C - \frac{L \cdot I_{SD}}{\sigma W_T V_{SD}}. \quad \text{(Equation 4)}$$

It may be worthwhile noting that the dimensions of the conductive region parallel to the surface remain constant and correspond to L and $W_C$, respectively.

Figure 3:
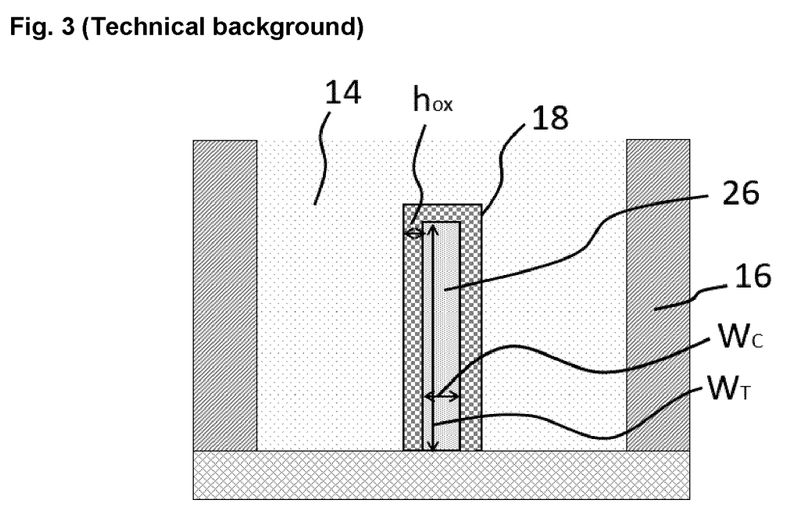
FIG. 3: is a schematic cross-sectional view of a FinFET.

It is also interesting to consider the case of a high-aspect-ratio FinFET (see FIG. 3, showing a FinFET in cross-section), having its main sensing surfaces on its sides and where the width $W_C$ of the channel is much smaller than its height $W_T$: $W_c \ll W_T$.

The measured current $I_{SD}$ is:

$$I_{SD} = \frac{V_{SD}}{\rho} \frac{(W_C - 2 \cdot W_D) \cdot (W_T - W_D)}{L}, \quad \text{(Equation 5)}$$

where $\rho=1/\sigma$ is the doping- and temperature-dependent resistivity of the semiconductor material. Since $W_c \ll W_T$, the depletion width can be approximated:

$$W_D \approx \frac{1}{2}\left(W_C - \frac{L \cdot \Sigma}{\sigma W_T}\right) = \frac{1}{2}\left(W_C - \frac{L \cdot I_{SD}}{\sigma W_T V_{SD}}\right). \quad \text{(Equation 6)}$$

Note than the sensitivity the case of a FinFET is increased as the impact of the depletion width on the current is twice that in a planar junction-less ISFET. The depletion width of a FinFET may be expressed as a function of the pH:

$$W_D = -\frac{\varepsilon_{Si}}{C_{ox}} + \sqrt{\left(\frac{\varepsilon_{Si}}{C_{ox}}\right)^2 - 2\left(\frac{\varepsilon_{Si}}{qN_A}\right)\left(2.3\frac{k_B T}{q}\alpha(\text{pH} - \text{pH}_{pzc}) + V_G\right)}, \quad \text{(Equation 7)}$$

where $\varepsilon_{Si}$ is the (absolute) permittivity of the semiconductor material (typically Si), $N_A$ is the semiconductor doping and $C_{ox}$ is the capacitance per unit area of the dielectric layer (typically, but not necessarily, an oxide).

The source-drain current $I_{SD}$ in each ISFET is linked (via the depletion width $W_D$) to the bulk pH by the following equation:

$$\text{pH} = \frac{-q}{2.3 k_B T \alpha} \left( \frac{q N_A W_D}{C_{ox}} + \frac{q N_A W_D^2}{2 \varepsilon_{Si}} + V_G \right) + \text{pH}_{pzc} \quad \text{(Equation 8)}$$

It is apparent from the two preceding equations that a degradation of the dielectric layer, which entails a change of the capacitance per unit area $C_{ox}$, has an impact on the relationship between resistance and pH. If $C_{ox}$ is assumed constant over the lifetime of an ISFET, degradation of the dielectric layer will result in a systematic error in the determined pH values.

For a new ISFET (no degradation of the dielectric layer), the capacitance per unit area $C_{ox}$ may be calculated as:

$$C_{ox} = \frac{\varepsilon_{ox}}{h_{ox}}, \quad \text{(Equation 9)}$$

where $\varepsilon_{ox}$ is the (absolute) permittivity of the dielectric layer and $h_{ox}$ the thickness of the dielectric layer.

If one assumes that the degradation of the dielectric layer corresponds to a change of the permittivity of the dielectric layer from the sensing surface down to a depth x, the capacitance per unit area $C_{ox}$ of the degraded dielectric layer may be written as:

$$C_{ox} = \frac{\varepsilon_{ox} \varepsilon'_{ox}}{\varepsilon_{ox} x + \varepsilon'_{ox}(h_{ox} - x)}, \quad \text{(Equation 10)}$$

where $\varepsilon'_{ox}$ is the (absolute) permittivity of the degraded dielectric layer. The underlying model is that the dielectric layer corresponds to two capacitors in series.

What follows from this is that the relationship between pH and source-drain resistance is differently affected in two ISFETs differing in the thicknesses of their dielectric layers. This is true, in particular, for ISFETs that are otherwise identical.

Figure 4:
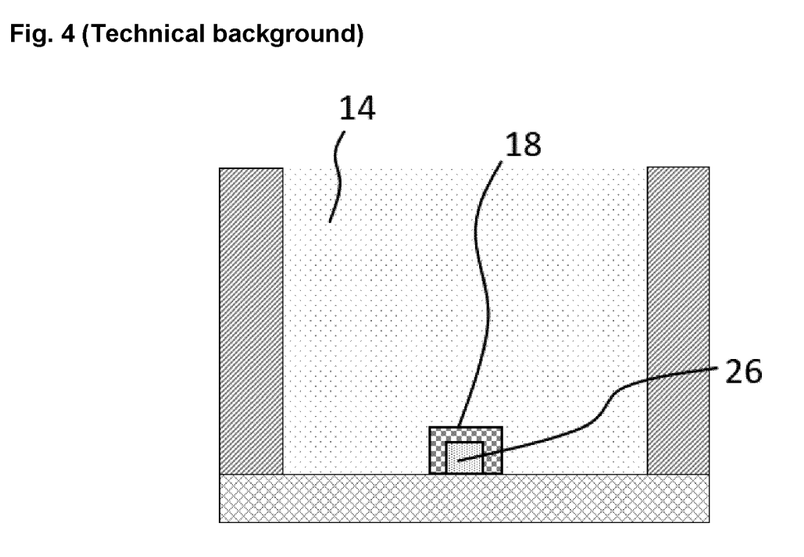
FIG. 4: is a schematic cross-sectional view of a nanowire ISFET.

FIG. 4 schematically illustrates a nanowire ISFET in cross-section. Due to the very small cross-sectional dimensions, high sensitivities can be reached with nanowire ISFETs. For nanowire ISFETs, similar relationships between pH and source-drain current $I_{SD}$ can be derived. However, the dimensions of the actually conducting channel with significantly vary with pH in both cross-sectional dimensions of the transistor channel.

Figure 5:
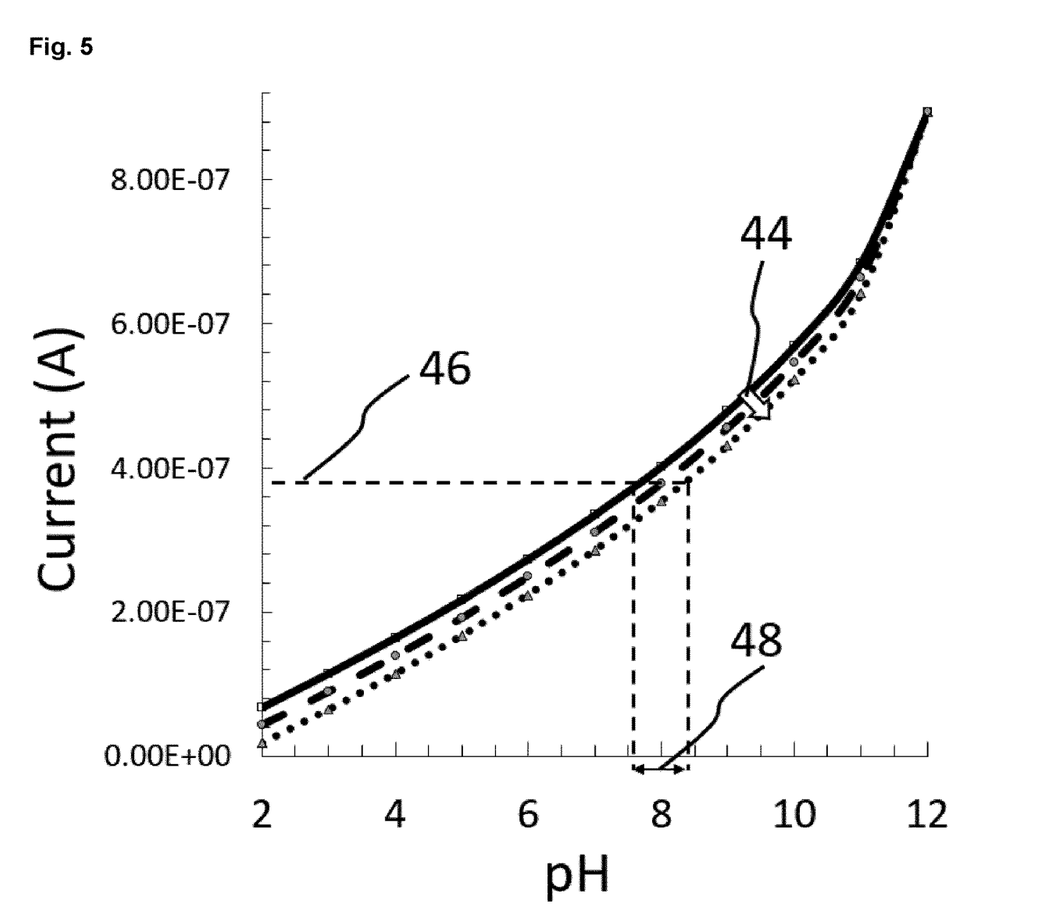
FIG. 5: is a graphic illustrating how an ISFET's response is influenced by dielectric layer degradation and/or surface contamination, leading to a lack of precision in the derived pH values.

FIG. 5 illustrates the (simulated) relationship between source-drain current and pH for a given ISFET at different stages of dielectric layer degradation (translating in different values of $C_{ox}$). With increasing degradation, the relationship between source-drain current and pH evolves as shown by arrow 44. If $C_{ox}$ is unknown, a single measurement 46 of the source drain current does not allow determining the pH precisely. The uncertainty in pH is shown at reference number 48.

Figure 6:
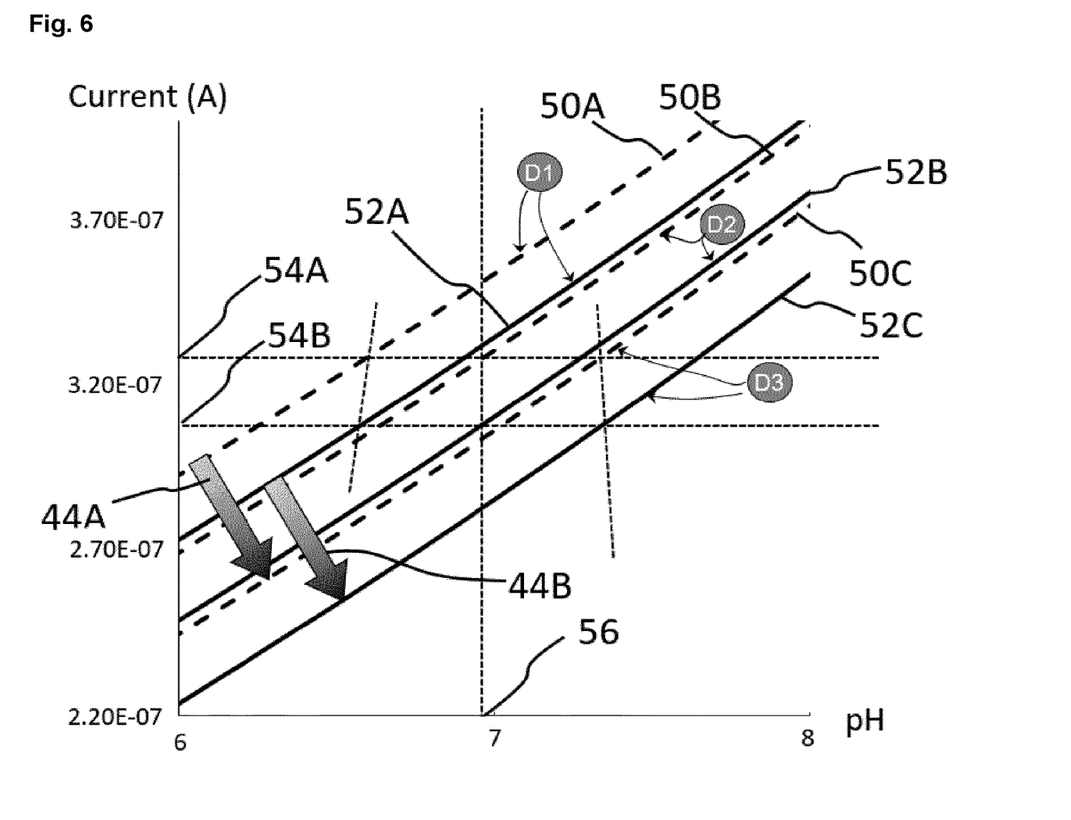
FIG. 6: is an illustration of a pH determination principle according to an embodiment of the invention.

FIG. 6 illustrates the (simulated) relationship between source-drain current and pH for a first ISFET (family of dashed curves 50A, 50B, 50C) at different stages (D1, D2, D3) of dielectric layer degradation as well as the (simulated) relationship between source-drain current and pH for a second ISFET (family of solid curves 52A, 52B, 52C), differing from the first ISFET by a different dielectric layer thickness, at the same stages (D1, D2, D3) of dielectric layer degradation. Evolution of the degradation is indicated by arrows 44A and 44B.

For a pair of source-drain currents 54A, 54B measured at about the same time with the first and second ISFETs, respectively, there only one degradation stage (here: D2) for which both measurements yield a common pH value (here: pH indicated at reference number 56). For degradation stages D1 and D3, the pH values yielded by the first and second measurements are different (the lines across the respective intersection points are not vertical in the graph of FIG. 4). It is worthwhile noting that degradation is a continuous process; accordingly, the family of curves representing the relationship between source-drain current and pH for the first or second ISFET may have an infinite number of intermediate curves. In practical applications, the curves or relationships may be defined by measurements (and/or simulation) for different pH values and stages of degradation and interpolation. The families of curves may thus be stored as lookup tables or similar data structures.

Figure 7:
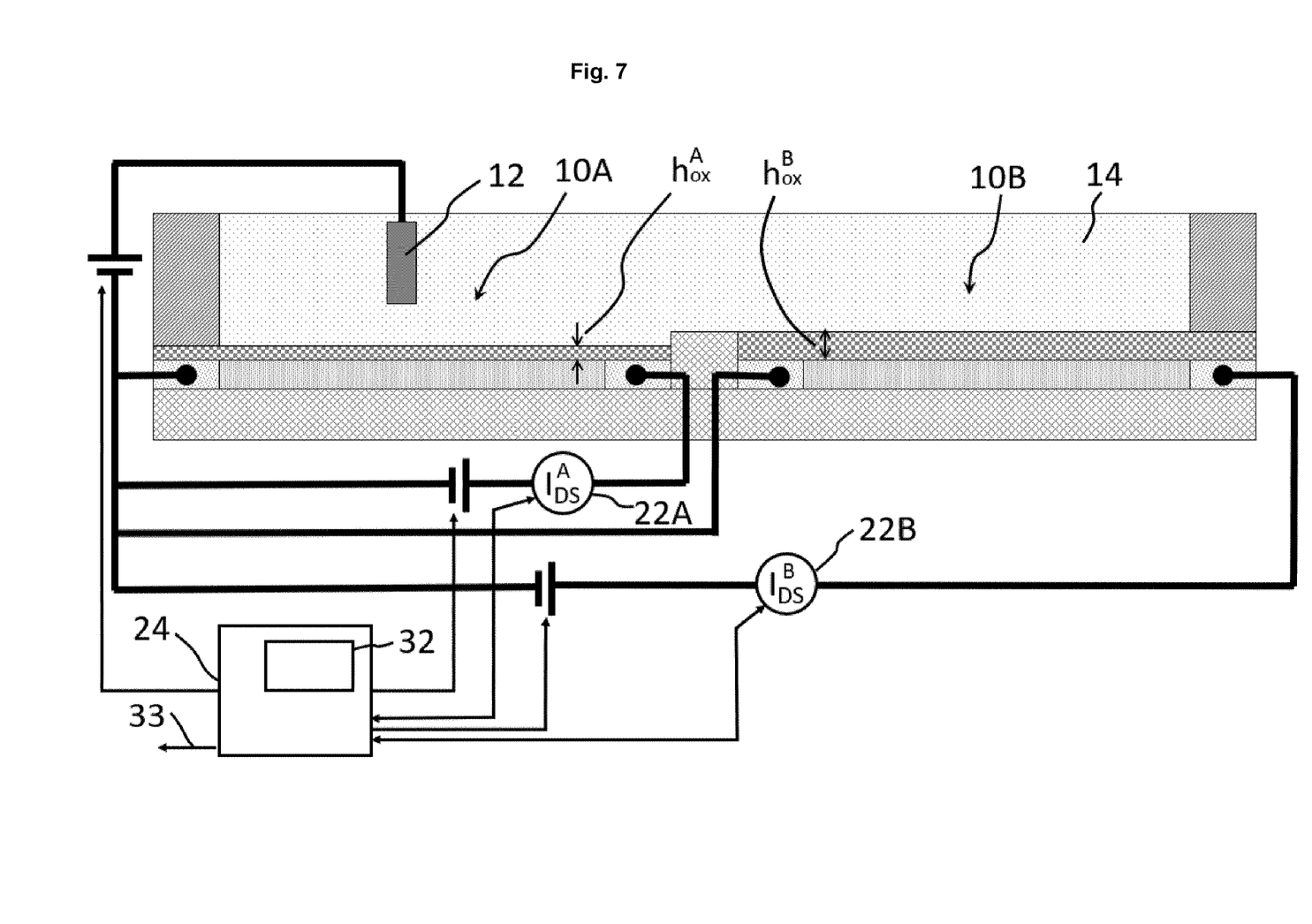
FIG. 7: is a schematic illustration of a pH sensor featuring two planar junction-less ISFETs in accordance with a preferred embodiment of the invention.

FIG. 7 shows a schematic illustration of a pH sensor according to an embodiment of the invention that includes two planar junction-less ISFETs 10A and 10B. Each ISFET 10A, 10B is configured as shown in FIG. 1. ISFETs 10A and 10B are essentially identical (in terms of materials and dimensions), except that the dielectric layer thicknesses $h_{ox}^A$ and $h_{ox}^B$ are different.

The sensing surfaces of both ISFETs 10A, 10B are arranged in the same chamber, so as to be exposed to the same electrolyte solution 14 when a pH measurement is carried out. Each ISFETs 10A, 10B is operatively connected to a respective measurement circuit, each comprising a current sensor 22A, 22B to measure the source-drain current $I_{DS}^A$ or $I_{DS}^B$.

The pH sensor of FIG. 7 further comprises a controller 24 operatively connected to the voltage (or current) sources and current (or voltage) sensors of the first and second measurement circuits. The controller 24 controls the operating parameters of the pH sensor (in particular the voltages and/or currents) and is configured to determine the pH of the electrolyte solution 14 under examination based on the measurements. The controller 24 could comprise a microcontroller, an application-specific integrated circuit (ASIC), a system on a chip (SoC), a programmable logic device (PLD), an erasable programmable logic device (EPLD), a programmable logic array (PLA), a field-programmable gate array (FPGA), a generic microprocessor (e.g. a Raspberry PI™ or Arduino™ board) and/or other hardware adequately programmed for the task, or the like. In the illustrated embodiment, the controller 24 has an internal memory 32 containing lookup tables and/or other data structures populated with data in a pre-characterization stage for each ISFET 10A, 10B. When the pH sensor is in use, the controller 24 determines, for each pair of first and second source-drain resistances, the corresponding matching combination of pH and dielectric layer degradation. The controller 24 issues at least the pH value as a digital output 33 (optionally also the level of degradation and/or a warning if degradation reaches a critical level. As mentioned previously, the memory 32 could be located remotely from the controller 24, provided that the controller 24 can access the memory by digital communication means, e.g. ethernet, TCP/IP, Wifi, etc.

Figure 8:
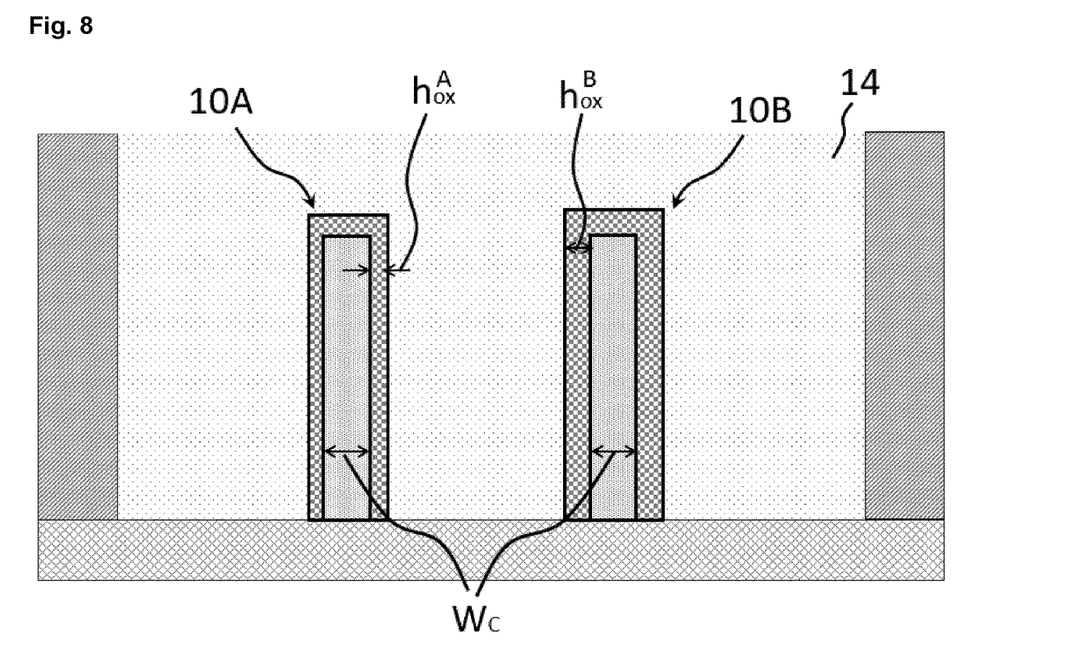
FIG. 8: is a schematic illustration of a pH sensor featuring two FinFETs with different dielectric layer thicknesses.

FIG. 8 shows a schematic cross-section of a pH sensor according to an embodiment of the invention that includes two ISFETs 10A and 10B configured as high-aspect-ratio FinFETs. The ISFETs have exactly the same configuration except for the dielectric layer thicknesses $h_{ox}^A$ and $h_{ox}^B$. Regarding the measurement circuits and the controller, these are as in the embodiment of FIG. 7.

Figure 9:
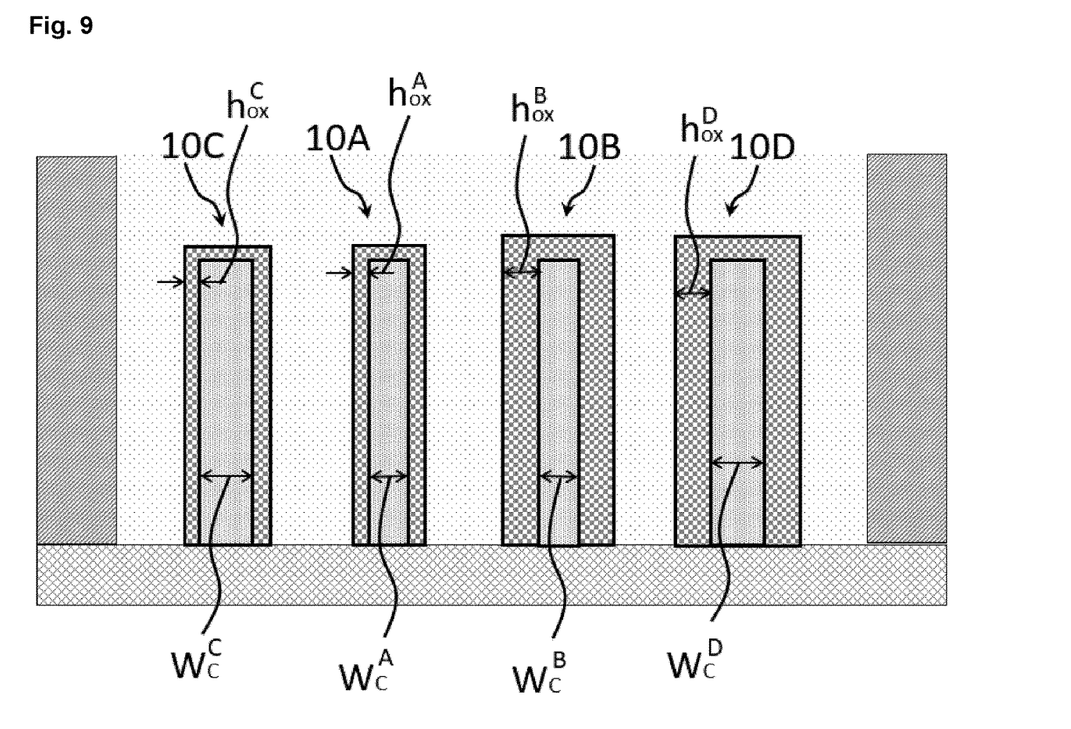
FIG. 9: is a schematic illustration of a pH sensor featuring four FinFETs with pairwise different device parameters.

FIG. 9 shows a schematic cross-section of a pH sensor according to an embodiment of the invention that includes four ISFETs. ISFETs 10A and 10B are essentially identical (in terms of materials and dimensions), except that their dielectric layer thicknesses $h_{ox}^A$ and $h_{ox}^B$ are different. ISFETs 10A and 10C are also essentially identical (in terms of materials and dimensions), except that their transistor channel width $W_C^A$ and $W_C^C$ are different. Likewise, ISFETs 10B and 10D are also essentially identical (in terms of materials and dimensions), except that their transistor channel width $W_C^B$ and $W_C^D$ are different. Finally, ISFETs 10C and 10D are essentially identical (in terms of materials and dimensions), except that their dielectric layer thicknesses $h_{ox}^C$ and $h_{ox}^D$ are different. To summarize: $W_C^A = W_C^B$, $W_C^A \neq W_C^C$, $W_C^B \neq W_C^D$, $W_C^C = W_C^D$, $W_C^A \neq W_C^D$, $W_C^B \neq W_C^C$, $h_{ox}^A \neq h_{ox}^B$, $h_{ox}^A = h_{ox}^C$, $h_{ox}^A \neq h_{ox}^D$, $h_{ox}^B \neq h_{ox}^C$, $h_{ox}^B = h_{ox}^D$ and $h_{ox}^C \neq h_{ox}^D$. Otherwise, the ISFETs 10A, 10B, 10C and 10D are identical.

Using equation 8 and, implicitly or explicitly, equation 5 (or a corresponding equation if another type of ISFET is used) for each ISFET, as system of equations can be provided for each measurement, which provides four source-drain resistances. This allows either for some redundancy (and thus consistency checks) or solving for additional parameters, e.g. temperature T.

Figure 10:
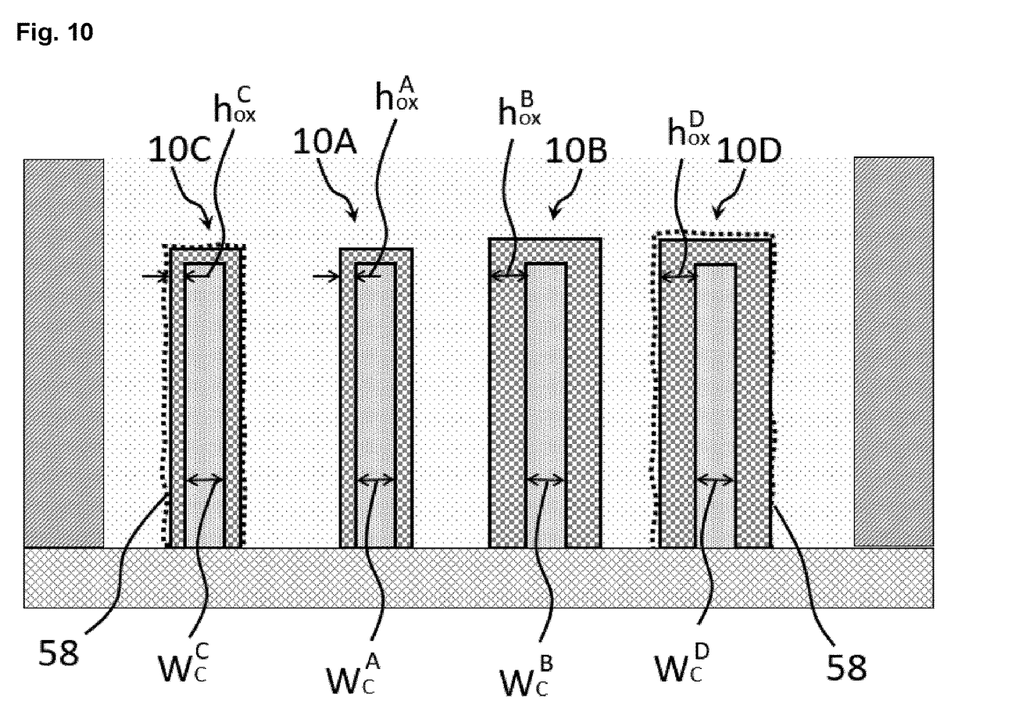
FIG. 10: is a schematic illustration of another pH sensor featuring four FinFETs with pairwise different device parameters.

FIG. 10 shows a schematic cross-section of a pH sensor according to an embodiment of the invention that includes four ISFETs. ISFETs 10A and 10B are essentially identical (in terms of materials and dimensions), except that their dielectric layer thicknesses $h_{ox}^A$ and $h_{ox}^B$ are different. ISFETs 10A and 10C are also essentially identical (in terms of materials and dimensions), except that ISFET 10C has a different surface functionalization 58 (e.g. a functionalization with APTES, totally or partially covering the sensing surface) on its sensing surface. ISFETs 10B and 10D are also essentially identical (in terms of materials and dimensions), except that ISFET 10D has also has surface functionalization 58 on its sensing surface. Finally, ISFETs 10C and 10D are essentially identical (in terms of materials and dimensions), except that their dielectric layer thicknesses $h_{ox}^C$ and $h_{ox}^D$ are different.

As mentioned previously, by using ISFETs that are identical except for surface functionalisation (and/or coverage) and thus have different sensitivity parameters a, the controller may detect and/or mitigate surface contamination, i.e. the occupation of surface sites by chemical substances present in the electrolyte solution(s).

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

BIBLIOGRAPHY

[1] P. Bergveld, "Development of an ion-sensitive solid-state device for neurophysiological measurements," *IEEE Trans. Biomed. Eng.*, no. 1, pp. 70-71, 1970.

[2] R. E. G. van Hal, J. C. T. Eijkel, P. Bergveld, "A general model to describe the electrostatic potential at electrolyte solution oxide interfaces," *Advances in Colloid and Interface Science*, vol. 69, pp. 31-62, 1996.

[3] S. Jamasb, S. Collins, and R. L. Smith, "A physical model for drift in pH ISFETs," vol. 49, pp. 146-155, 1998.

[4] S. Sinha et al., "Modeling and simulation of temporal and temperature drift for the development of an accurate ISFET SPICE macromodel," *J. Comput. Electron.*, vol. 19, no. 1, pp. 367-386, 2020.

[5] M. Zaborowski, D. Tomaszewski, J. Malesinska, and P. Grabiec, "Fabrication and characterization of junctionless MOSFETs for sensor applications," *Proc. 21st Int. Conf. Mix. Des. Integr. Circuits Syst. Mix.* 2014, pp. 367-371, 2014.

[6] Y. Cui, Q. Wei, H. Park, and C. M. Lieber, "Nanowire nanosensors for highly sensitive and selective detection of biological and chemical species," *Science (80-.).*, vol. 293, no. 5533, pp. 1289-1292, 2001.

[7] M. Zaborowski, D. Tomaszewski, P. Dumania, and P. Grabiec, "From FinFET to nanowire ISFET," *Eur. Solid-State Device Res. Conf.*, no. September, pp. 165-168, 2012.

[8] S. Rollo, D. Rani, R. Leturcq, W. Olthuis, P. Garc, and C. Group, "A high aspect ratio Fin-Ion Sensitive Field Effect Transistor: compromises towards better electrochemical bio-sensing."

[9] S. Rollo, D. Rani, R. Leturcq, W. Olthuis, and C. Pascual Garcia, "High Aspect Ratio Fin-Ion Sensitive Field Effect Transistor: Compromises toward Better Electrochemical Biosensing," *Nano Lett.*, vol. 19, no. 5, pp. 2879-2887, 2019.

[10] J.-K. Park and W.-J. Cho, "Development of high-performance fully depleted silicon-on-insulator based extended-gate field-effect transistor using the parasitic bipolar junction transistor effect," *Appl. Phys. Lett.*, vol. 101, no. 13, p. 133703, 2012.

[11] S. Jamasb, S. D. Collins, and R. L. Smith, "Correction of instability in ion-selective field effect transistors (ISFETs) for accurate continuous monitoring of pH," in *Proceedings of the 19th Annual International Conference of the IEEE Engineering in Medicine and Biology Society. 'Magnificent Milestones and Emerging Opportunities in Medical Engineering'* (Cat. No. 97CH36136), 1997, vol. 5, pp. 2337-2340.

[12] S. Jamasb, "An analytical technique for counteracting drift in ion-selective field effect transistors (ISFETs)," *IEEE Sens. J.*, vol. 4, no. 6, pp. 795-801, 2004.

[13] M. P. Das and M. Bhuyan, "Drift and temperature compensation scheme for an intelligent ion-sensitive field effect transistor sensory system," in *2012 5th International Conference on Computers and Devices for Communication (CODEC)*, 2012, pp. 1-4.

[14] S. Casans, A. E. Navarro, D. Ramirez, J. M. Espi, N. Abramova, and A. Baldi, "Instrumentation system to improve ISFET behaviour," in IMTC/2002. *Proceedings of the 19th IEEE Instrumentation and Measurement Technology Conference (IEEE Cat. No. 00CH37276)*, 2002, vol. 2, pp. 1291-1294.

[15] B. Premanode, N. Silawan, and C. Toumazou, "Drift reduction in ion-sensitive FETs using correlated double sampling," *Electron. Lett.*, vol. 43, no. 16, pp. 857-859, 2007.

[16] S. Shah and J. B. Christen, "Pulse width modulation circuit for ISFET drift reset," in *SENSORS, 2013 IEEE*, 2013, pp. 1-4.

[17] M. Kalofonou and C. Toumazou, "A Low Power Sub-pW Chemical Gilbert Cell for ISFET Differential Reaction Monitoring," *IEEE Trans. Biomed. Circuits Syst.*, vol. 8, no. 4, pp. 565-574, 2013.

[18] H.-J. Jang and W.-J. Cho, "High performance silicon-on-insulator based ion-sensitive field-effect transistor

[18] ... "using high-k stacked oxide sensing membrane," *Appl. Phys. Lett.*, vol. 99, no. 4, p. 43703, 2011.

[19] H.-J. Jang, M.-S. Kim, and W.-J. Cho, "Development of Engineered Sensing Membranes for Field-Effect Ion-Sensitive Devices Based on Stacked High-κ Dielectric Layers," *IEEE electron device Lett.*, vol. 32, no. 7, pp. 973-975, 2011.

[20] S. Rollo, D. Rani, W. Olthuis, and C. Pascual Garcia, "High performance Fin-FET electrochemical sensor with high-k dielectric materials," *Sensors Actuators B. Chem.*, vol. 303, no. September 2019, p. 127215, 2020.

[21] W. Olthuis, J. Luo, B. H. der Schoot, P. Bergveld, M. Bos, and W. E. der Linden, "Modelling of non-steady-state concentration profiles at ISFET-based coulometric sensor-actuator systems," *Anal. Chim. Acta*, vol. 229, pp. 71-81, 1990.

[22] E. M. Briggs, E. H. De Carlo, C. L. Sabine, N. M. Howins, and T. R. Martz, "Autonomous Ion-Sensitive Field Effect Transistor-Based Total Alkalinity and pH Measurements on a Barrier Reef of Kāhe'ohe Bay," 2020.

[23] P. Bergveld, "The operation of an ISFET as an electronic device," *Sensors and Actuators*, vol. 1, no. C, pp. 17-29, 1981.

[24] S. Rollo, D. Rani, R. Leturcq, W. Olthuis, and C. Pascual, "Correction to: A high aspect ratio Fin-Ion Sensitive Field Effect Transistor: compromises towards better electrochemical bio-sensing," vol. 1, no. c, p. 10.

The invention claimed is:

1. A pH sensor, comprising
a chamber for receiving an electrolyte solution;
a first and a second ion-sensitive field effect transistor (ISFETs), each of the first and second ISFETs having a source terminal, a drain terminal and a transistor channel extending between the source terminal and the drain terminal;
a dielectric layer with a sensing surface arranged in the chamber so as to be contactable by the electrolyte solution, the dielectric layer separating the sensing surface from the transistor channel;
a first measurement circuit configured to measure a first source-drain resistance across the transistor channel of the first ISFET;
a second measurement circuit configured to measure a second source-drain resistance across the transistor channel of the second ISFET; and
a controller;
the first and second measurement circuits including a common reference electrode, the reference electrode arranged contactable by the electrolyte solution in the chamber;
wherein the dielectric layer of first ISFET has a first thickness and the dielectric layer of the second ISFET has a second thickness different from the first thickness;
wherein the controller is operatively connected to the first and second measurement circuits and configured to determine pH of the electrolyte solution based on the first source-drain resistance and the second source-drain resistance under the constraint of a dielectric layer degradation parameter common to the first ISFET and the second ISFET.

2. The pH sensor as claimed in claim 1, wherein the difference in the thicknesses of the dielectric layers of the first and second ISFETs causes dielectric layer degradation to affect a relationship between the first source-drain resistance and pH differently than a relationship between the second source-drain resistance and pH.

3. The pH sensor as claimed in claim 2, wherein the difference in the thicknesses of the dielectric layers of the first and second ISFETs causes dielectric layer degradation to affect, at a given time, a different proportion of the dielectric layer of the first ISFET than of the dielectric layer of the second ISFET.

4. The pH sensor as claimed in claim 1, wherein the controller has electronic access to a map that maps pairs of first and second source-drain resistances to pH, and wherein the controller is configured to determine pH by using the map.

5. The pH sensor as claimed in claim 1, wherein the controller is configured to use a model-based filter to determine pH.

6. The pH sensor as claimed in claim 5, wherein the model-based filter includes at least one of a Kalman filter, an extended Kalman filter, an unscented Kalman filter, a hybrid Kalman filter and a dynamic data reconciliation filter.

7. The pH sensor as claimed in claim 1, wherein at least one of the first and second ISFETs is a FinFET.

8. The pH sensor as claimed in claim 1, wherein the transistor channels of the first and second ISFETs are made of the same semiconductor material, have the same doping and have the same dimensions.

9. The pH sensor as claimed in claim 1, wherein the sensing surfaces of the of the first and second ISFETs have the same surface functionalisation.

10. The pH sensor as claimed in claim 1, wherein the first and second ISFETs are identical except for the first and second thicknesses.

11. The pH sensor as claimed in claim 1, comprising a third and a fourth ISFET, the third ISFET being identical to the first ISFET except that the sensing surface of the third ISFET has a different surface functionalisation and/or coverage than the first ISFET and the fourth ISFET being identical to the second ISFET except that the sensing surface of the fourth ISFET has a different surface functionalisation and/or coverage than the second ISFET.

12. The pH sensor as claimed in claim 3, wherein the first and second ISFETs are FinFETs, wherein the transistor channels of the first and second ISFETs are made of the same semiconductor material, have the same doping and have the same dimensions, and wherein the sensing surfaces of the of the first and second ISFETs have the same surface functionalisation.

13. The pH sensor as claimed in claim 12, wherein the first and second ISFETs are identical except for the first and second thicknesses.

14. The pH sensor as claimed in claim 13, comprising a controller operatively connected to the first and second measurement circuits and configured to determine pH of the electrolyte solution based on the first source-drain resistance and the second source-drain resistance, wherein the controller has electronic access to a map that maps pairs of first and second source-drain resistances to pH, and wherein the controller is configured to determine pH by using the map.

15. A pH sensor, comprising:
a chamber for receiving an electrolyte solution;
a first and a second ion-sensitive field effect transistor (ISFETs), each of the first and second ISFETs having a source terminal, a drain terminal and a transistor channel extending between the source terminal and the drain terminal;
a dielectric layer with a sensing surface arranged in the chamber so as to be contactable by the electrolyte solution, the dielectric layer separating the sensing surface from the transistor channel;

a first measurement circuit configured to measure a first source-drain resistance across the transistor channel of the first ISFET;

a second measurement circuit configured to measure a second source-drain resistance across the transistor channel of the second ISFET;

the first and second measurement circuits including a common reference electrode, the reference electrode arranged contactable by the electrolyte solution in the chamber;

wherein the dielectric layer of first ISFET has a first thickness and the dielectric layer of the second ISFET has a second thickness different from the first thickness;

wherein the pH sensor further comprises a third and a fourth ISFET, the third ISFET being identical to the first ISFET except that the dielectric layer of the third ISFET comprises a different material than the first ISFET and the fourth ISFET being identical to the second ISFET except that the dielectric layer of the fourth ISFET comprises a different material than the second ISFET.

16. A pH sensor, comprising:

a chamber for receiving an electrolyte solution;

a first and a second ion-sensitive field effect transistor (ISFETs), each of the first and second ISFETs having a source terminal, a drain terminal and a transistor channel extending between the source terminal and the drain terminal;

a dielectric layer with a sensing surface arranged in the chamber so as to be contactable by the electrolyte solution, the dielectric layer separating the sensing surface from the transistor channel;

a first measurement circuit configured to measure a first source-drain resistance across the transistor channel of the first ISFET;

a second measurement circuit configured to measure a second source-drain resistance across the transistor channel of the second ISFET;

the first and second measurement circuits including a common reference electrode, the reference electrode arranged contactable by the electrolyte solution in the chamber;

wherein the dielectric layer of first ISFET has a first thickness and the dielectric layer of the second ISFET has a second thickness different from the first thickness;

wherein the pH sensor further comprises a third and a fourth ISFET, the third ISFET being identical to the first ISFET except that the transistor channel of the third ISFET has a different cross-sectional area and/or a different length than the transistor channel of the first ISFET and the fourth ISFET being identical to the second ISFET except that the transistor channel of the fourth ISFET has a different cross-sectional area and/or a different length than the transistor channel of the first ISFET.

17. A pH sensor, comprising:

a chamber for receiving an electrolyte solution;

a first and a second ion-sensitive field effect transistor (ISFETs), each of the first and second ISFETs having a source terminal, a drain terminal and a transistor channel extending between the source terminal and the drain terminal;

a dielectric layer with a sensing surface arranged in the chamber so as to be contactable by the electrolyte solution, the dielectric layer separating the sensing surface from the transistor channel;

a first measurement circuit configured to measure a first source-drain resistance across the transistor channel of the first ISFET;

a second measurement circuit configured to measure a second source-drain resistance across the transistor channel of the second ISFET;

the first and second measurement circuits including a common reference electrode, the reference electrode arranged contactable by the electrolyte solution in the chamber;

wherein the dielectric layer of first ISFET has a first thickness and the dielectric layer of the second ISFET has a second thickness different from the first thickness;

wherein the pH sensor further comprises a third, a fourth, a fifth and a sixth ISFET, the first, third and fifth ISFETs being pairwise identical except for a difference in one of:

sensing surface functionalisation and/or coverage, dielectric layer material, and transistor channel cross-sectional area and/or length;

the second, fourth and sixth ISFETs being pairwise identical except for a difference in one of:

sensing surface functionalisation and/or coverage, dielectric layer material, and transistor channel cross-sectional area and/or length.

18. The pH sensor as claimed in claim 17, wherein the third and the fourth ISFETs are identical except for dielectric layer thickness and wherein the fifth and the sixth ISFETs are also identical except for dielectric layer thickness.

* * * * *